Jan. 20, 1970

H. FURKERT 3,490,868

METHOD OF RECOVERY OF SULPHURIC ACID

Original Filed Nov. 5, 1965

United States Patent Office 3,490,868
Patented Jan. 20, 1970

3,490,868
METHOD OF RECOVERY OF SULPHURIC ACID
Herbert Furkert, Grosskonigsdorf, Germany, assignor, by mesne assignments, to Chemiebau Dr. A. Zieren G.m.b.H. & Co. K.G., Cologne-Braunsfeld, Germany, a corporation of Germany
Continuation of application Ser. No. 506,513, Nov. 5, 1965. This application Mar. 4, 1968, Ser. No. 710,395
Claims priority, application Germany, Nov. 6, 1964, C 34,298
Int. Cl. C01b 17/74
U.S. Cl. 23—168                                         6 Claims

ABSTRACT OF THE DISCLOSURE

Sulphuric acid is produced from sulfur dioxide-containing gases utilizing a multi-stage catalytic oxidation process and a two-stage sulfur trioxide absorption. The first absorption stage is arranged before the last oxidation stage and the second absorption stage is arranged after the last oxidation stage. The sulfur trioxide-free exhaust gas leaving the first absorption stage is reheated to the starting temperature for the last oxidation stage with superheated steam. The steam is obtained from an exothermic step of the overall sulfuric acid recovery process starting with a sulfur-containing raw material.

---

Figure 1:
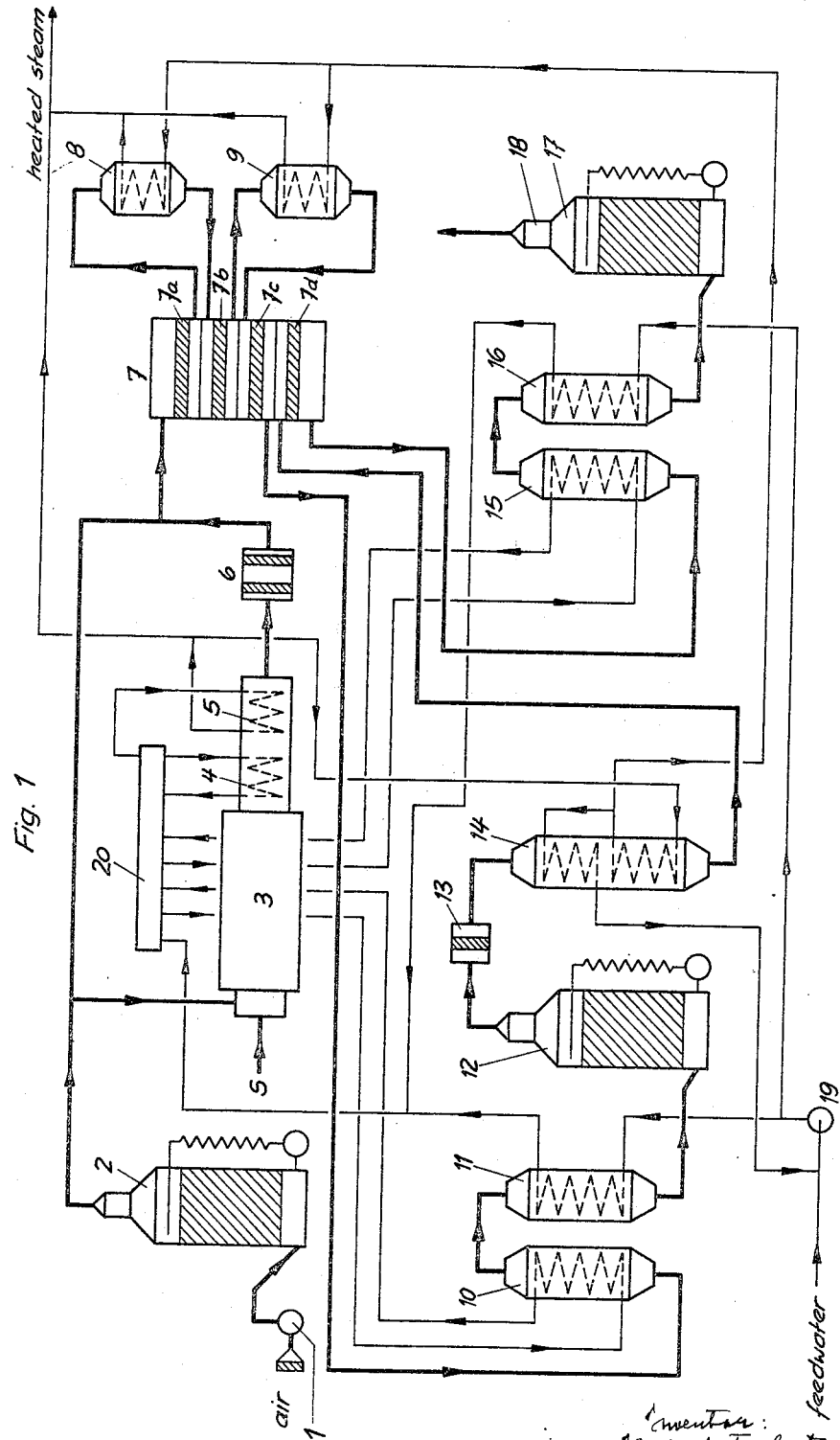

This application is a continuation of application Ser. No. 506,513, filed Nov. 5, 1965 and now abandoned.

The present invention relates to a method for recovering sulphuric acid.

It is known to catalytically oxidize $SO_2$-containing gases in several stages, and to absorb the $SO_3$ in sulphuric acid in two absorbing towers, and carrying out the last stage of the contact oxidation after the first absorption.

A number of proposals are known to heat the waste gases of the first absorption with the heat from the catalytic oxidation, or with the heat from burning sulfur or roasting of sulfur-containing ores, to the starting temperature required for the last contact oxidation stage. It has been proposed recently to catalytically oxidize gases with 9–12% $SO_2$ in several stages, to absorb $SO_3$ in two steps, and to heat the $SO_3$-free exhaust gases from the first absorber to the starting temperature required for the last contact oxidation stage by using heat from the next to last contact stage. In the known methods, the heat is transferred by means of heat exchange surfaces, directly from the hotter to the colder gases.

The use of the roasting gases involves difficulties because the heat transfer is hindered by the deposit of dust on the heat exchange surfaces. Since it is necessary to operate in a counter current system, the heat exchange surfaces are so hot at one end, that very expensive construction material is required. At the cold end, the wall temperatures are, however, below the acid dew point of the roasting gases which contain $SO_3$ and $H_2O$ vapor. The acid dew points of such gases are so high at temperatures such as 250° C., that even highly alloyed steel cannot stand up to the attack of the sulphuric acid. A further disadvantage is the large diameter long pipe conduits needed to carry the exhaust gases from the first absorber of the contact apparatus to the roasting furnace and back again. Since contact apparatus is built today for much greater outputs, as multi-stage roasting ovens, the exhaust gases of the first absorber are distributed by means of expensive control units to a plurality of heat exchangers.

The heat exchanger operation when using gases obtained by burning hydrogen sulfide, or by degrading depleted sulphuric acid involves even greater difficulties because the gases are even hotter and their acid dew points are particularly high due to there large steam content.

Sulfur combustion gases with a high $SO_2$ content are likewise so hot that the heat exchange surfaces must be formed of expensive material. Even when the gases are dry, their dew point is not too much lower for this reason.

The high temperatures of these combustion gases from the noted operations which are of advantage for the heat transfer and permit small exchange surfaces because of their high temperature, cause appreciable difficulties in the application of the known methods, in connection with the required apparatus. The re-heating of the waste gases of the first absorber using the heat from the contact oxidation product gases assumes that the arrangement is operated very precisely and the heat exchange is equally balanced. Otherwise it is difficult to reach the starting temperature, even if the exchange surface is designed adequately, because it is necessary to operate with small temperature differences and low heat passage numbers. For gases with a low $SO_2$-content the available heat from the catalytic oxidation is not sufficient to heat the gases after the first absorber to the starting temperature of the last contact step.

It is an object of the present invention to provide an improvement in the process for recovering sulphuric acid from sulfur dioxide-containing gas utilizing a multi-stage catalytic oxidation procedure and utilizing at least two sulfur trioxide absorption stages, by improved utilization of heat obtained from at least one of the exothermic processes of the overall sulfuric acid recovery process.

The process of the present invention provides a method for recovering sulphuric acid from $SO_2$-containing gases utilizing a multi-stage catalytic oxidation procedure and utilizing absorption of sulfur trioxide in at least two stages, the first absorption being before the last oxidation stage and the second absorption being after the last oxidation stage, wherein the exhaust gases from the first $SO_3$ absorption unit are heated to the starting temperature required for the last oxidation stage by being passed in heat exchange contact with superheated steam. The superheated steam is heated by heat obtained from at least one of the exothermic processes of the overall sulphuric acid recovery process. These exothermic processes include the combustion of sulfur or sulfur-containing materials, the exothermic degradation of depleted sulphuric acid, and each of the catalytic oxidation stages. In one preferred embodiment of the invention the steam, which has been used to raise the temperature of the exhaust gases from the first $SO_3$ absorption unit to the starting temperature required for the last oxidation stage, is again heated by heat obtained from one of the aforementioned exothermic processes, and then used for conventional purposes such as the generation of electric energy or the melting of sulfur. The condensate obtained in the processes of this invention is returned to the steam producer.

In another preferred embodiment of the present invention, the exhaust gases from the first $SO_3$ absorption unit are first passed in heat exchange relationship with the sulfur trioxide-containing gaseous product from the last oxidation stage whereby the temperature of the exhaust gases is raised to between about 300° C. to 400° C. Said heated exhaust gases are then further heated to the starting temperature required for the last oxidation stage by heat exchange contact with superheated steam. Utilizing this embodiment, the superheated steam is not cooled to its saturation temperature and is still hot enough to be used directly for conventional purposes such as the production of electric energy.

The processes of the present invention are particularly applicable for recovering $SO_2$ from gases containing between about 9% and 12%. They are also suitable for treatment of gases of any conventional concentration, including concentrations less than 9%, e.g., as low as 6%, and gases containing more than about 12%.

An embodiment of the processes of the present invention is schematically illustrated in the flow sheet of FIGURE 1. The description is given in the form of an illustrative example. All percentages are noted by volume. The blower 1 pushes filtered air through the drying tower 2 into the sulfur furnace 3. The sulfur furnace 3 is connected with the steam producer 4 and the steam superheater 5. The combustion gas products (gas) from furnace 3, containing 12% sulfur dioxide and 9% oxygen are cooled by contact with hot steam, for example, steam at 40 atmospheres and 450° C. The combustion gases are cooled from 1050° C. to 640° C., and then further cooled to 460° C.

Dust is removed from these combustion gases in the filter 6. The combustion gases can then be adjusted to the desired temperature for introduction into the first contact sep 7a of contact apparatus 7, e.g., 450° C., by the addition of air from drying tower 2. After passage through contact step 7a, the gases are passed through steam superheater (or steam producer) 8, where they are cooled from 590° C. to 450° C. The cooled gases are then passed through the second contact step 7b and then passed through the steam superheater (or steam producer) 9 where they are cooled from 550° C. to 450° C. The gases are then passed through the third contact step 7c and leave at a temperature of 500° C. with 90.4% of the sulfur dioxide in the original combustion gases reacted to form $SO_3$. These gases are then cooled in steam producer 10 and the feed water heater 11 to a temperature of 200° C. The $SO_3$-containing gases are then passed through the first absorber 12 containing circulating sulphuric acid which absorbs most of the $SO_3$. The gas is then passed through spray separator 13. These substantially $SO_3$-free exhaust gases are now heated in accordance with the process of the present invention in the heater 14 with superheated steam at 40 atmospheres and at 450° C., from a temperature of 50° C. to 425° C. and then passed into the fourth contact step 7d. The gases from contact step 7d at a temperature of 450° C. are passed into the steam producer 15 and then feed water heater 16, with a consequent lowering of the gases' temperature to 200° C. The cooled gases are then passed into the second $SO_3$-absorber 17. The product from absorber 17 is then passed through spray stripper 18 resulting in exhaust gases containing only 0.05% sulfur dioxide and being substantially free of sulfur trioxide, when the original combustion gases in furnace 3 are produced from dried sulfur which does not contain hydrogen compounds.

For the installation described, and utilizing feed water at 135° C., a total of 4 square meters of evaporation surfaces and superheating surfaces, as well as 3.5 square meters of preheating surfaces are required per ton of $H_2SO_4$ per hour. 4.8 square meters of surface suffice for heating the exhaust gases from the first absorber. Thus, a total of only 12.3 square meters of heat exchange surfaces are required. For each ton of $H_2SO_4$ per hour, 1080 kilogram of steam are available for the production of electric energy, and the superheating of 857 kg. of steam and condensation of 211 kg. of steam are used for heating the exhaust gases from the first absorber. The condensate returns to the feed water and is pumped by pump 19 into steam receiver 20. That portion of the saturated steam bled from heater 14 is again superheated, for example in devices 8 and 9.

Figure 2:
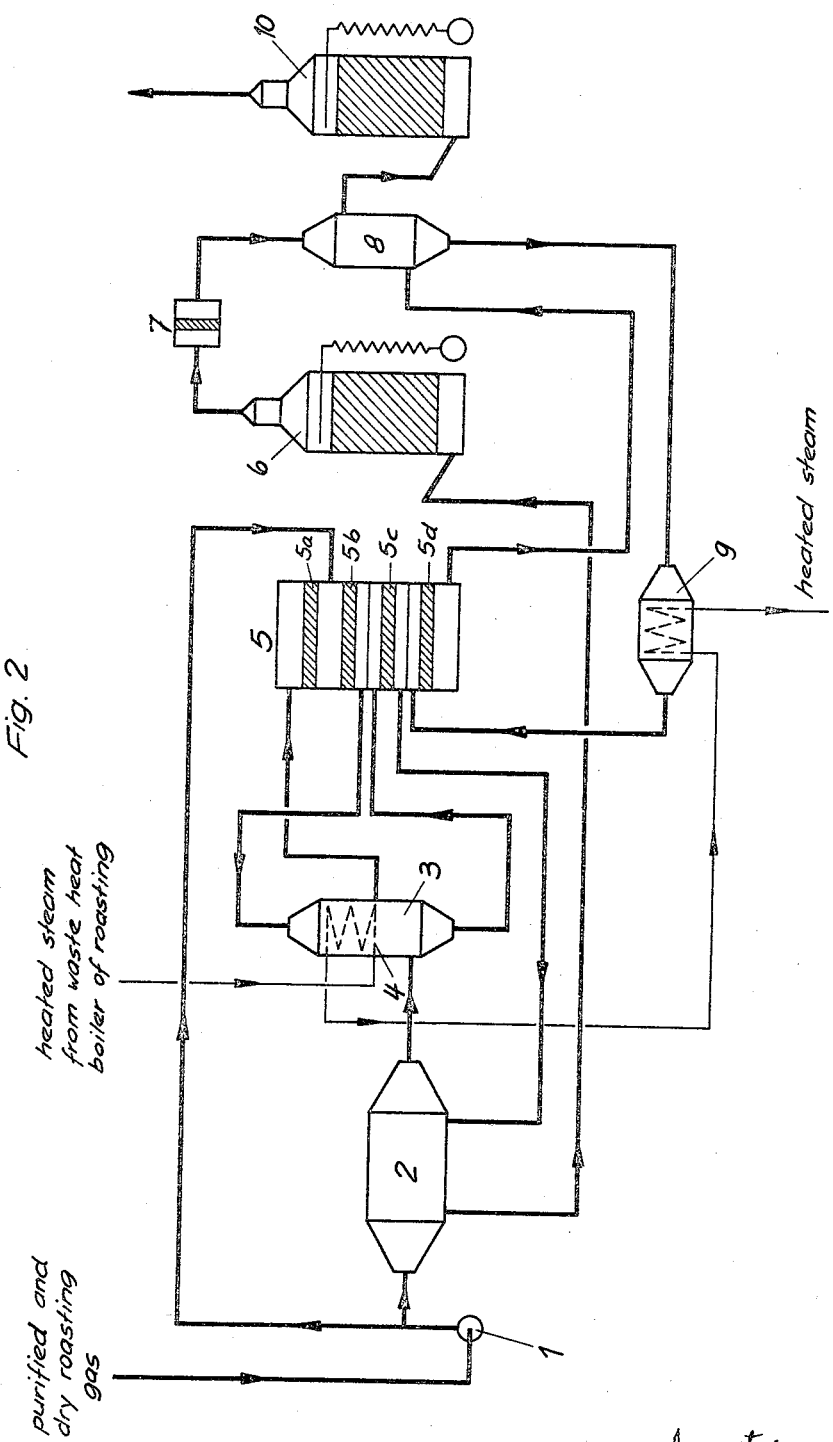

FIGURE 2 is a schematic drawing of another embodiment of the process of the present invention. Clean dried gases obtained from the roasting of pyrite and containing 10% sulfur dioxide and 8% oxygen are pumped by blower 1 through heat exchanger 2 and then through heat exchanger 3 which contains the steam superheating unit 4. The gases are then moved into the contact apparatus 5. As noted in the schematic drawing, the heat exchange units 2 and 3 obtain their heat from the reacting gases in the contact apparatus which is led to the heat exchangers between sequential stages in the multistage contact apparatus 5. The gas being heated in the exchangers 2 and 3 is brought to an initial temperature, e.g., 450° C. before it is introduced into the first stage 5a of the contact apparatus 5. During the passage through the contact apparatus the temperature of the gas is increased. Cold roasting gases are added to the contact apparatus after the stage 5a to control the temperature. After passage through the second stage 5b, the gases are routed through the steam superheater 4 and heat exchanger 3 and then to the third stage 5c of the contact apparatus 5. The gases from stage 5c, with 91% of the original sulfur dioxide reacted, are passed in heat exchange relationship through heat exchanger 2 and then into the first $SO_3$ absorber 6. The exhaust gases from absorber 6 are then passed through spray separator 7 after which they are practically $SO_3$ free. These gases are then moved through heat exchanger 8 where the temperature is raised from 50° C. to about 350° C. The high temperature heat exchange medium utilized in heat exchange unit 8 is the hot reaction gases from contact apparatus 5 after passage through the last stage 5d. These hot gases are cooled in heat exchanger 8 from temperatures of about 450° C. to 150° C. The exhaust gases from the first absorber which have been heated in heat exchanger 8 are then passed through heat exchanger 9 where their temperature is raised to 425° C. by heat exchange contact with superheated steam at 40 atmospheres and 500° C. temperature. At this temperature the exhaust gases are introduced into the last contact stage 5d. The gases from stage 5d are then passed into heat exchanger 8 at a temperature of 450° C. as aforedescribed. After passage through heat exchanger 8, the gases are then passed through the second $SO_3$ absorber 10. The exhaust gases from absorber 10 contain only 0.04% sulfur dioxide and practically no $SO_3$.

The effective surfaces, per ton of $H_2SO_4$ per hour, in the heat exchanger are 3.9 square meters, in the heater, 0.7 square meter, totaling 4.6 square meters. The total installation, excluding the heating vessel in the roasting furnace, and excluding the acid cooler, contains 10 square meters of heat exchange, superheating, and cooling surfaces. The steam emerges from the roasting at 40 atmospheres and a temperature of 450° C., and, after being used in the process of the present invention, is available at a temperature of 410° C. for the production of electric energy. The steam obtained from the roasting and contact oxidation operations is 935 kilograms.

From the foregoing examples, it is apparent that the process of the present invention avoids all the drawbacks which have been connected with the exploitation of the heat from roasting, or from combustion or from the catalytic oxidation, for re-heating the exhaust gases from the first $SO_3$ absorber. This is accomplished while permitting multiple use of the steam produced by conventional methods in sulphuric acid installations. The steam producers and steam superheaters utilized have the advantage that the temperature of the cooling surfaces remains above the acid dewpoint of the $SO_3$-containing gases so long as the gases are not dried due to operational irregularities. The process exploits the steam produced in an advantageous manner for safely operating a multi-stage sulfur-dioxide catalytic oxidation in conjuction with a two-stage $SO_3$ absorption system, even when using pure sulfur dioxide gases. Heating vessels may be used utilizing, not only sulfur and pyrite as raw materials, but also such raw materials as zinc blende, copper pyrites, waste acids, and other poor raw materials, to produce sulphuric acid. Another appreciable advantage of the process of the present invention is that it permits rebuilding existing sulphuric acid installations to utilize the two-step $SO_3$ absorption process and to produce exhaust gases from the second $SO_3$ absorber containing sufficiently little $SO_3$ as to meet the current rigorous requirements for such exhaust gases.

What is claimed is:

1. In a method for recovering sulfuric acid from $SO_2$-containing gases which comprises:

in a reaction zone, forming hot $SO_2$-containing gas from sulfur-containing starting material;

passing the $SO_2$-containing gas through the oxidation stages of a multi-stage contact apparatus which is adapted to convert sulfur dioxide to sulfur trioxide, introducing gas leaving the next to last oxidation stage into a first absorption unit adapted to absorb resultant sulfur trioxide contained in said gas with sulfuric acid;

thereafter indirectly heating the substantially $SO_3$-free exhaust gas from the first absorption unit by means of a heating medium to the starting temperature required for oxidation of residual sulfur dioxide in the last stage;

then passing said heated sulfur dioxide containing gas through the last oxidation stage of said contact apparatus to convert substantially all the residual sulfur dioxide to sulfur trioxide; and introducing the exhaust gas from said last oxidation stage into a second absorption unit adapted to absorb sulfur trioxide contained in said gases, the improvement which comprises the steps of:

(a) generating superheated steam in heat transfer relationship with said hot $SO_2$-containing gas leaving said reaction zone; and (b) passing resultant superheated steam in indirect heat exchange with said substantially sulfur trioxide-free exhaust gas from said first absorption unit.

2. A method as defined by claim 1 wherein the hot $SO_2$-containing gas is produced from the combustion of sulfur or roasting of sulfur-containing materials.

3. A method as defined by claim 1 wherein the hot $SO_2$-containing gas is produced from the thermal decomposition of waste sulfuric acid.

4. A method as defined by claim 1 comprising a further step of generating steam in indirect heat exchange with the hot exhaust gas from at least one catalytic oxidation stage in the multi-stage contact apparatus, said steam being then superheated in step (a).

5. A method as defined by claim 1 wherein said $SO_2$-containing gases contain at least 6% $SO_2$.

6. A method as defined by claim 1 wherein said superheated steam in step (b) is the sole heating medium for raising the $SO_3$-free exhaust gas to the starting temperature required for oxidation of residual sulfur in the last stage.

References Cited

UNITED STATES PATENTS

| 2,863,723 | 12/1958 | Tigges | 23—168 |
| 2,926,143 | 2/1960 | Leland | 252—417 |
| 3,259,459 | 7/1966 | Moller | 23—175 X |

FOREIGN PATENTS

| 1,177,117 | 9/1964 | Germany. |

OSCAR R. VERTIZ, Primary Examiner

G. T. OZAKI, Assistant Examiner

U.S. Cl. X.R.

23—175, 176